United States Patent

[11] 3,576,133

| [72] | Inventors | Walter J. Krupick |
| | | Succasana; |
| | | Richard F. Cimera, Fairfield, N.J. |
| [21] | Appl. No. | 751,963 |
| [22] | Filed | Aug. 12, 1968 |
| [45] | Patented | Apr. 27, 1971 |
| [73] | Assignee | Singer-General Precision, Inc. |
| | | Little Falls, N.J. |

[54] MEANS FOR DYNAMICALLY BALANCING A GYROSCOPE
6 Claims, 4 Drawing Figs.

[52] U.S. Cl. .................................................. 74/5,
73/468
[51] Int. Cl. ..................................................... G01c 19/04,
G01m 1/32
[50] Field of Search........................................ 74/5, 5.7,
5.8, 573; 73/66, 178, 460, 469, 468, (Inquired)

[56] References Cited
UNITED STATES PATENTS

| 2,243,458 | 5/1941 | Esval et al. ................... | 74/(5UX) |
| 2,735,305 | 2/1956 | Mathiesen .................... | 74/5 |
| 2,937,613 | 5/1960 | Larsh ........................... | 73/66X |
| 2,979,957 | 4/1961 | Havser et al. ................ | 73/468X |
| 2,995,934 | 8/1961 | Adams et al. ................ | 74/5X |
| 3,074,682 | 1/1963 | Kennel ......................... | 74/5X |
| 3,077,785 | 2/1963 | Stiles .......................... | 74/5 |
| 3,299,714 | 1/1967 | Thompson et al. ........... | 73/468 |

*Primary Examiner*—Manuel A. Antonakas
*Attorneys*—S. A. Giarratana, G. B. Oujevolk and S. M. Bender ABSTRACT: In free-rotor flexure suspended gyroscopes it is common to mount the inertia wheel gimbal at one end of the drive shaft and to mount the motor drive assembly at the other end of the shaft. This arrangement usually produces an offset between the mass center of the inertia wheel-gimbal assembly and the rotation axis of the shaft. The offset, in turn, creates a dynamic torque unbalance which causes a "wobbling" or vibration about the gyroscope mounting plane. In order to cancel this dynamic unbalance torque, a pair of dissimilar masses are positioned within the gyro's motor hub assembly. The masses, which are diametrically opposed within the plane of unbalance, are also axially displaced relative to one another. The resulting arrangement balances the forces and torques acting on the rotating portion of the gyroscope thereby cancelling the vibrations in the mounting plane.

INVENTORS
WALTER J. KRUPICK
RICHARD F. CIMERA

MEANS FOR DYNAMICALLY BALANCING A GYROSCOPE

BRIEF SUMMARY OF THE INVENTION

The present invention relates generally to the art of gyroscopes, and more specifically, to improvements in free-rotor flexure suspended gyroscopes such as those disclosed, for example, in U.S. Pat. No. 3,077,785 by J.C. Stiles and U.S. Pat. No. 3,354,726 by W.J. Krupick et al., both assigned to the assignee of the instant invention. In particular, the subject matter herein relates to a method and means for dynamically balancing the rotor or inertial flywheel in such gyroscopes without affecting the static radial balance of the flywheel about its own flexure hinge axis.

Heretofore, attempts have been made to limit dynamic unbalance in free-rotor flexure suspended gyroscopes by the conventional method of simply adding or removing material from the gyro rotor or flywheel per se. The idea was to statically unbalance the mass of the rotor so as to cancel the dynamic torques resulting from the offset between the rotor's flexure hinge axis and the rotor's spin axis. And although this technique did reduce dynamic unbalance to acceptable levels, the added or removed material unfortunately created an additional undesirable unbalance about the flywheel's flexure hinge axis. In operation, then, this unwanted or static radial unbalance, as it was termed, had a tendency to become severely amplified in the presence of axial vibrations equal to the rotor's spin frequency and therefore seriously compromised the performance of the gyro.

Thus, in accordance with the principles of the present invention, a method and means are disclosed hereinbelow for substantially reducing the dynamic unbalance in free-rotor flexure suspended gyros without introducing undesirable static radial unbalances. In brief, the invention contemplates the initial step of radially positioning the rotor and its flexure hinge assembly relative to the spin shaft axis until a coarse adjustment is realized corresponding, say, to a residual dynamic unbalance on the order of 5 dyn.-cm. Fine tuning is then accomplished by differentially axially positioning a pair of dissimilar masses (i.e., screws, cylindrical plugs, etc.) concentrically located in the motor drive hub assembly with respect to the rotor spin axis. The masses are so arranged as to produce a resultant force and couple equal and opposite to the dynamic torque unbalance resulting from the residual offset between flexure hinge and spin axes after the aforementioned coarse adjustment.

These and other objects and advantages as well as a more detailed and thorough understanding of the inventive concept contemplated herein will be apparent from a study of the following detailed description of the invention in connection with the accompanying drawings.

DETAILED DESCRIPTION OF THE INVENTION

Figure 1:
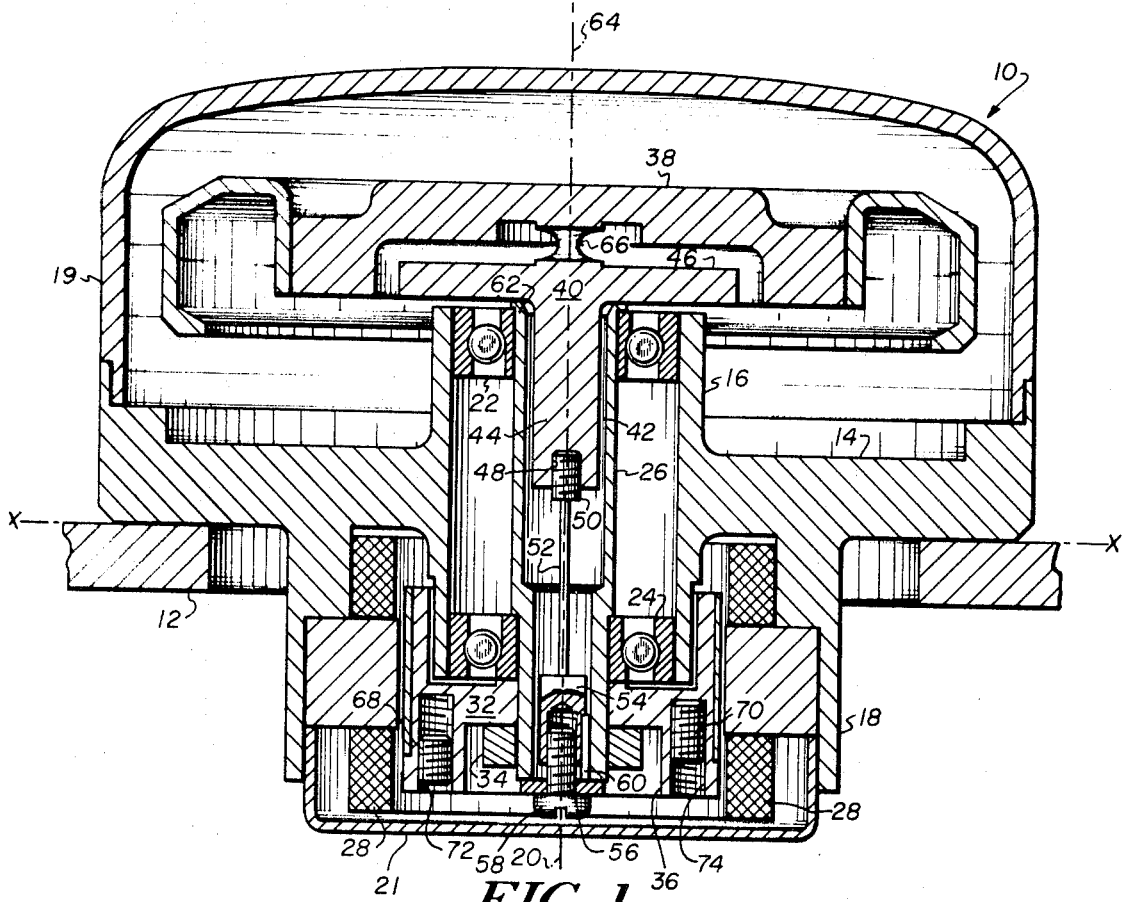
FIG. 1 is a cross-sectional view of a free-rotor flexure suspended gyroscope.

Referring now to FIG. 1, there is shown in cross section, a gyroscope 10 of the free-rotor flexure suspended type mounted within a suitable recess on a platform 12. The platform may comprise a stabilized inertial reference table or it may simply represent the frame of the supporting vehicle. In any event, the gyro is normally supported along a plane X—X coinciding with the upper surface of platform 12 and extending normal to the plane of the paper as viewed in FIG. 1. Gyroscope 10 is generally similar to the free-rotor flexure suspended gyros fully disclosed in the aforementioned Krupick et al. and Stiles patents, and therefore only those parts which are necessary for a full and complete understanding of the present invention have been illustrated herein.

Accordingly, gyroscope 10 is shown to include an integral main frame portion having an annular flange 14, a hollow cylindrical bushing 16, and a downwardly extending cylindrical skirt 18. An upper end enclosure cap member 19 is mated to the flange 14 along the latter's peripheral edge to form an enlarged upper cavity within which the gyro's inertial flywheel 38 and other components (not shown) such as torquers, pickoffs and the like, are located. The flange, bushing, and skirt are coaxially related to one another with respect to a spin or reference axis 20 passing vertically through the gyroscope in the plane of the paper. Supported within bushing 16 at either extremity thereof are respective ball bearing units 22 and 24 for axially and radially supporting a hollowed-out drive shaft 26 for rotation about spin axis 20.

Located within the lower cavity formed by the downwardly extending cylindrical skirt 18 and a bottom end enclosure cap member 21 is a conventional electric motor drive means for rotating the shaft 26. The motor which has its stator windings 28 secured to the interior surface of peripheral wall 18 includes an armature assembly in the form of a generally cylindrical hub member 32 coaxially positioned on drive shaft 26 as shown. Preferably, hub member 32 is press-fit over the drive shaft and secured in an abutting relation against the inner race of lower ball bearing unit 24 by a hex nut 34 or similar fastener threadedly secured to the lower end of hollow drive shaft 26 within a counterbored recess 36 in the lower surface of the hub member. In operation, energization of the stator windings 28 causes the hub assembly 32 and therefore the shaft 26 to spin about axis 20.

The inertial flywheel or rotor 38 of the gyroscope is mounted for rotation on a supporting gimbal unit 40 which latter is generally positioned in a coaxial manner with respect to shaft 26 and which has a cylindrical downwardly extending portion 44 and an integral upper annular flange portion 46 coaxially and symmetrically disposed in relation to each other. The outer diameter of this downwardly extending portion is sufficiently dimensioned to create an annular clearance gap or spacing 42 between the latter's peripheral outside surface and the interior cylindrical surface of drive shaft 26 so that the radial position of the gimbal unit may be adjusted over a predetermined range when the gimbal unit is coaxially disposed relative to and within shaft 26 substantially as shown.

The lowermost end of the gimbal unit's downwardly extending portion 44 includes therein a centrally tapped recess 48 for cooperatively engaging the threaded enlarged upper end portion 50 of an integrally attached coaxial tensionable connecting rod 52. Integrally attached to the lower end of connecting rod 52 is an enlarged coaxially disposed cylindrical end portion 54 which includes a centrally tapped recess therein for cooperatively engaging the threaded end 56 of a tensioning bolt 58. Lower end portion 54 also includes a keyway which cooperates with a key 60 attached to the inner wall of shaft 26 to prevent relative rotation between connecting rod 52 and shaft 26 during tightening of bolt 58. When the latter is sufficiently torqued, a tension force will be transmitted through lower end portion 54, connecting rod 52, and upper end portion 50 to the downwardly extending portion 44 of gimbal unit 40. This tension force will, in turn, cause the gimbal unit's annular flange 46 to bear downwardly against the upper annular end face 62 of shaft 26 in locking frictional engagement therewith sufficient to prevent relative rotation between the gimbal unit 40 and the shaft 26. With this arrangement, it is thus possible to loosen bolt 58, radially adjust the position of gimbal unit 40 within clearance gap 42 and then to lock the gimbal unit to the shaft 26 for rotation therewith about spin axis 20 by retightening bolt 58.

It will be observed that the entire interconnected assembly including rotor 38 and gimbal unit 40 is symmetrically and coaxially disposed about a vertical axis 64 passing centrally therethrough as viewed in FIG. 1. This last-mentioned axis represents the mass center of the rotor-gimbal assembly and is to be distinguished from the spin or reference axis 20 which represents the assembly's center of rotation.

The interconnection between rotor 38 and gimbal unit 40 comprises in its preferred form, a flexure hinge 66 formed from a unitary solid cylinder of resilient spring metal having a symmetrically machined or otherwise necked-down portion intermediate the rotor and the gimbal unit as shown. The upper end of the flexure hinge is either pressed into or otherwise fixedly fastened to the rotor while the lower end thereof integral with, or fixedly fastened to the gimbal unit. While this relatively simple form of flexure hinge coupling is virtually identical to the flexure hinge disclosed in the patent to Stiles, supra, it is to be understood that the more sophisticated hinge assembly disclosed in the aforementioned patent to Krupick et al. may be used instead. In fact, any form of universal connection between the rotor 38 and the gimbal unit 40 would satisfy the requirements of the present invention.

Thus, in operation, positive rotation is transferred from shaft 26 through gimbal unit 40 and flexure hinge 66 to rotor 38, with the hinge permitting the rotor to flex or pivot relative to gimbal 40 (hence shaft 26) about any transverse axis passing through the hinge's necked-down portion perpendicular to axis 64. As hereinafter applied to the present invention, axis 64 will be referred to as the flexure hinge axis.

In principal, the gyroscope of FIG. 1 could be made perfectly dynamically balanced with respect to the mounting plane X-X if gimbal unit 40 were exactly aligned within clearance gap 42 such that the flexure hinge axis 64 (i.e., the mass center of the rotor-gimbal assembly) was made perfectly coincidental with the spin axis 20. However, due to manufacturing tolerances, this condition of perfect coincidence between the respective axes is for all intents and purposes impossible to achieve in practice. At best, minimum radial offsets between the two axes may be realized on the order of 50 microinches corresponding to a dynamic unbalance of approximately 5 dyn.-cm., for example.

Therefore, in accordance with the present invention and in order to provide a more refined compensation for dynamic unbalance, suitable means are provided for cancelling the residual dynamic unbalance remaining after the gimbal unit 40 has been initially radially adjusted within clearance gap 42. Such means in its preferred form, comprises a pair of "masses" or "weights" 68 and 70 disposed in suitable recesses 72 and 74 located in the motor hub assembly 32. The recesses which are diametrically located on opposite sides of spin axis 20 are arranged parallel to and equidistantly radially spaced from the spin axis substantially as shown. Each recess, in addition, is tapped to receive a respective one of the "weights" 68, 70 which are preferably in the form of externally threaded cylindrical plugs. The recesses 72 and 74 are made deep enough to permit respective plugs 60 and 70 to be axially displaceable therein over a predetermined limited range. During assembly, the plugs which have different masses and therefore may have different lengths are individually adjusted within their respective recesses until they are axially displaced from each other by a predetermined amount as generally indicated in FIG. 1. The plugs are then fixed in position by suitable means, such as, for example, filling the recesses with cement and then curing same by application of heat.

The reasons for ensuring a relative difference in mass between plugs 68 and 70, and for axially displacing the plugs relative to each other within the motor hub assembly will now be explained with reference to FIG. 2.

Figure 2:
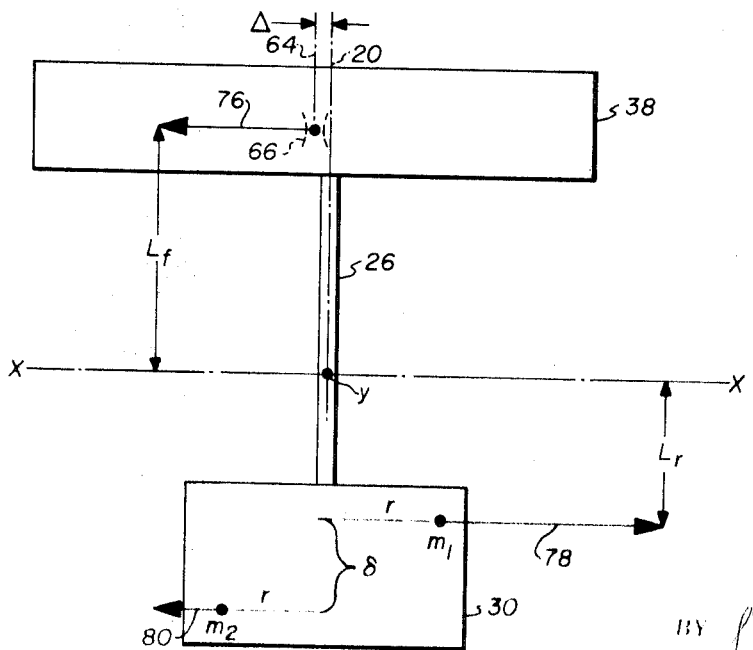
FIG. 2 is a free body diagram of the rotor and drive motor hub assembly used in the gyroscope of FIG. 1, and FIGS. 3 and 4 are schematic views of an alternate preferred form of the subject invention.

In FIG. 2, there is schematically shown a free body diagram of the rotating portion of gyroscope 10, namely, rotor 38, spin shaft 26, and motor hub 32. It will be recalled that the rotor is fixed relative to the shaft by tightening bolt 58 after gimbal 40 has been radially positioned within clearance gap 42. This provides a relatively coarse adjustment resulting in a residual offset $\Delta$ between the flexure hinge axis 64 representing the mass center of the rotor-gimbal assembly and the spin axis 20 representing the center of rotation of shaft 26, hub assembly 32 and the aforementioned rotor-gimbal assembly. As a result of the residual offset $\Delta$, a dynamic unbalance torque is created tending to "wobble" or vibrate the entire rotating assembly about the mounting plane X-X. This dynamic unbalance torque is given by $F_t \omega L_f$ (1) where $F_t \omega$ is a centrifugal force directed radially outward as indicated by vector 76, and $L_f$ represents the lever arm between vector 76 and mounting plane X-X.

The force $F_t \omega$ may be calculated from the expression $M \Delta \omega^2$ (2) where $M$ represents the mass of the rotor-hinge-gimbal assembly, $\Delta$ is equal to the residual offset described above, and $\omega$ is equal to the rotor's angular velocity. $M$ and $\omega$ are predeterminable known constants while $\Delta$ may be accurately measured on a conventional dynamic balancing machine.

As conceived by the present invention, the dynamic unbalance torque of equation (1) may be cancelled by positioning the differentially weighted plugs 68 and 70 in the motor hub assembly as generally described above in connection with FIG. 1; that is, the plugs are axially displaced from one another with reference to spin axis 20 by a predetermined amount. In terms of FIG. 2 the cylindrical plug 70 may be schematically represented by mass $m_1$ which produces a centrifugal radially outward force represented by vector 78 equal in magnitude to $m_1 r \omega^2$ (3) whereas cylindrical plug 68 (which it will be remembered weighs less than plug 70) may be represented by mass $m_2$ which produces a centrifugal radially outward force represented by vector 80 and equal in magnitude to $m_2 r \omega^2$ (4) Convenient values for $m_1$ and $m_2$ may then be chosen in accordance with the following relation $M \Delta \omega^2 + m_2 r \omega^2 = m_1 r \omega^2$ (5) which is another way of saying that the sum of the forces acting on the system of FIG. 2 is made equal to zero. In order to fully satisfy the conditions of dynamic equilibrium, however, it is also necessary to balance the sum of the torques acting on the system with reference to mounting plane X-X. This is accomplished by axially displacing masses $m_1 m_2$ (i.e., plugs 70, 68, FIG. 1) by an amount $\delta$ such that $M \Delta \omega^2 (L_f) + m_1 r \omega^2 (L_r) = m_2 r \omega^2 (L_r + \delta)$ (6) Since the moment arms $L_f$ and $L_r$ are given by geometry, values for $\delta$ may be easily calculated from equation (6) for different values of $m_1$ and $m_2$. It is thus seen that by providing a differential pair of masses in the motor hub assembly equidistantly spaced from the spin axis and axially displaced relative to each other by a predetermined amount $\delta$, the dynamic unbalance torque acting on the rotating portion of the gyroscope may be entirely cancelled.

From FIG. 2, it becomes reasonably evident that masses $m_1$ and $m_2$ corresponding to plugs 70 and 68 must be located in the plane of maximum offset between axes 64 and 20. Moreover, the plug having greater mass (in the case illustrated, plug 70 or mass $m_1$) must be located in this plane diametrically opposed to vector 76 with respect to spin axis 20. Thus, in carrying out the dynamic balancing method of the present invention, it is essential that the plane of dynamic unbalance be located before plugs 68 and 70 are distributed within the motor hub assembly 30 as previously described. This may be done in a preferred manner by mounting the gyroscope on a conventional precision dynamic balancing machine such as the MODEL K1B-Dynamic Balancer sold by Micro Balance Inc., Farmingdale, Long Island, New York. When the plane of unbalance has been located, the motor hub assembly may then be removed by loosening nut 34 and the recesses 72 and 74 drilled therein to the required depth. Alternatively, the motor hub assembly may be predrilled with a series of recesses, say eight, for example, whose centers are equidistantly spaced on an appropriately located circle concentric to the spin axis 20. The diametrically opposing pair of recesses closest to the plane of unbalance will then receive the cylindrical plugs 68 and 70 as herein aforesaid while the remaining recesses may receive dummy plugs of equal mass if desired.

Figure 3:
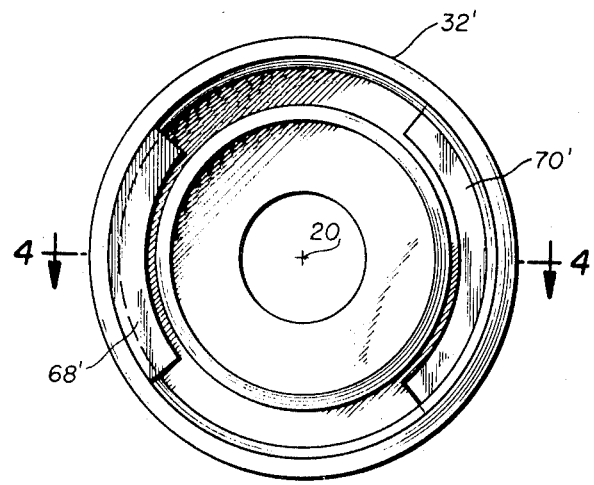
Figure 4:
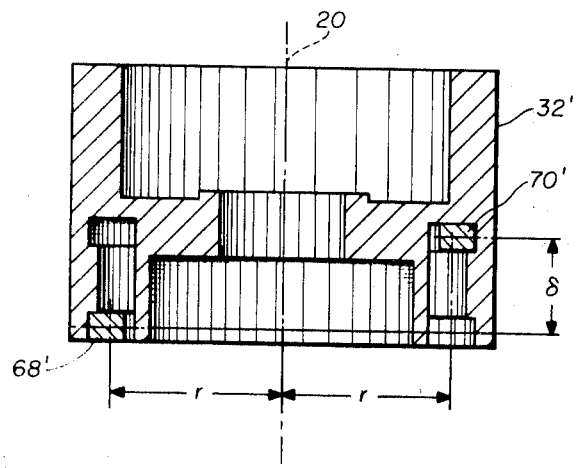

Moreover, it is to be understood that masses $m_1$ and $m_2$ do not necessarily have to comprise cylindrical plugs or screws as illustrated by way of example in FIG. 1. In the alternate preferred embodiment shown in FIGS. 3 and 4, the masses are in the form of segments of a ring or hollow cylinder 68' and 70' cemented in place and located as before.

Obviously, many additional variations may be made without departing from the principals of the present invention and/or from the spirit and scope of the appended claims.

We claim:

1. In a free-rotor flexure suspended gyroscope having a drive shaft, a gimbal supported rotor mounted at one end of the shaft and a drive motor hub assembly mounted at the other end of the shaft, wherein the improvement comprises:
    means for cancelling the dynamic unbalance resulting from the displacement between the mass center of said gimbal supported rotor and the center of rotation of said shaft,
    said means comprising a pair of dynamic balancing masses associated with said motor hub assembly.

2. The apparatus of claim 1 wherein said pair of masses is fixedly supported by said motor hub assembly such that each mass in said pair is displaced from said center of rotation and is in diametrical opposition to the other mass in said pair.

3. The apparatus of claim 2 wherein the masses in said pair are different and are axially spaced from each other by a predetermined amount whereby the resultant of the forces and torques acting on said drive shaft and being produced by said displacement and each of said different masses during rotation of said shaft are zero.

4. The apparatus of claim 3 wherein said motor hub assembly includes at least a pair of recesses each one of which is parallel to the axis of rotation of said drive shaft and is radially displaced therefrom and wherein each of said masses comprises a cylindrical element adapted for disposition within each said recess, respectively.

5. The apparatus of claim 3 wherein said pair of masses comprises segments of a ring disposed within a cylindrical recess in said motor hub assembly, said recess being coaxially located relative to the axis of rotation of said assembly.

6. In a free-rotor flexure suspended gyroscope having a drive shaft, a gimbal supported rotor mounted on one end of said shaft and a drive motor hub assembly mounted on the other end of the shaft, the method of cancelling the dynamic unbalance of said gyroscope resulting from the noncoincidence between the mass axis of said gimbal supported rotor and the rotational axis of said drive shaft comprising the steps of:
    locating the plane of unbalance including the aforementioned axes,
    determining the amount of noncoincidence between the aforementioned axes and therefore the unbalance force acting on said shaft,
    affixing a first weighted element to the motor hub assembly offset from the rotation axis in the plane of unbalance and diametrically opposed to the unbalance force direction,
    affixing a second weighted element to the motor hub assembly in symmetrical diametrical opposition to said first weighted element with respect to said rotation axis, the sum of forces produced by said offset weighted elements being equal to and opposite to said unbalance force during rotation of said shaft, and
    axially displacing one weighted element with respect to the other in the plane of unbalance until the resultant torques acting on the shaft with regard to a predetermined reference plane and being produced by the unbalance force and each weighted element respectively are equal to zero during rotation of the shaft.